Feb. 3, 1970   J. V. BOYLE, JR   3,492,739
ADJUSTABLE ATTITUDE GUIDE DEVICE
Filed Aug. 11, 1967
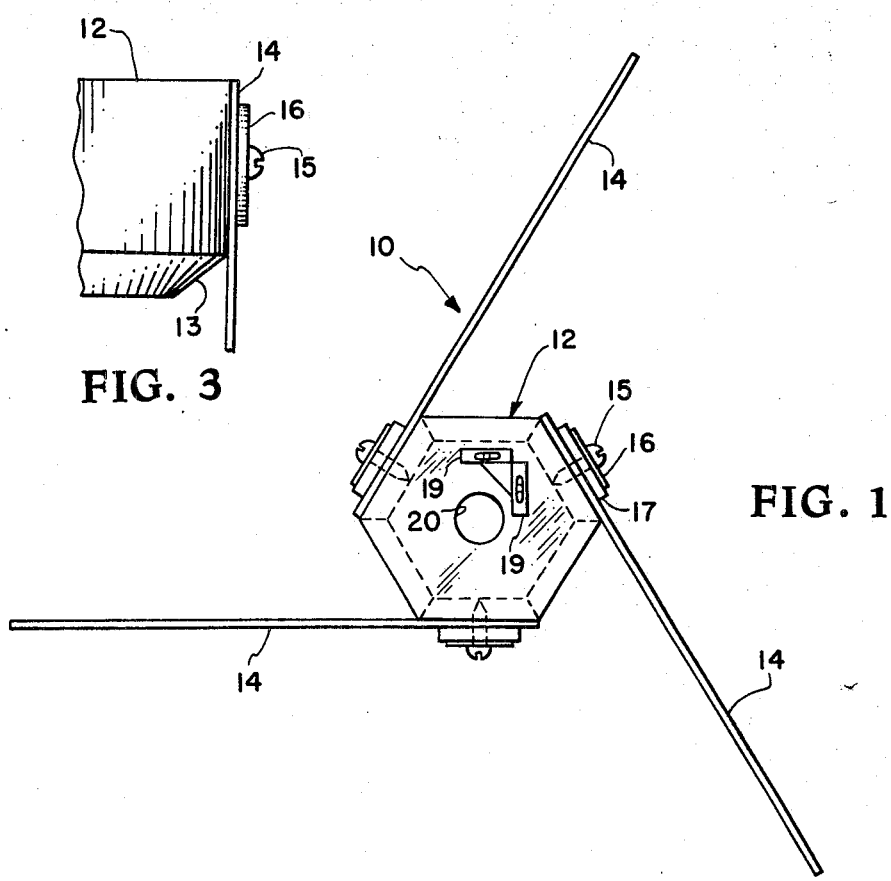
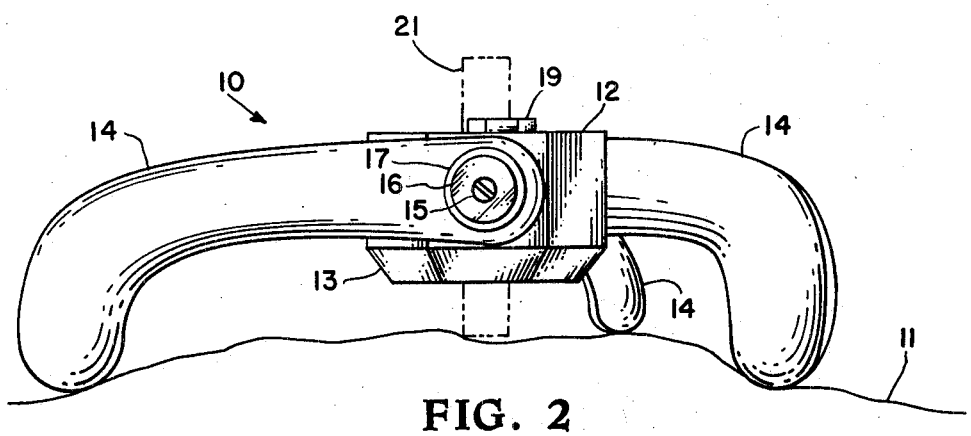
INVENTOR
JOSEPH V. BOYLE, JR.
BY
ATTORNEYS United States Patent Office 3,492,739
Patented Feb. 3, 1970

3,492,739
ADJUSTABLE ATTITUDE GUIDE DEVICE
Joseph V. Boyle, Jr. Hampton, Va., assignor to the United States of America as represented by the Administrator of the National Aeronautics and Space Administration
Filed Aug. 11, 1967, Ser. No. 660,572
Int. Cl. G01c 9/02; F16m 11/24
U.S. Cl. 33—207   2 Claims

ABSTRACT OF THE DISCLOSURE

A guide block having three independently adjustable legs each having a major portion extending from the guide block substantially parallel to the horizontal and a minor portion extending substantially perpendicular from the major portion. The guide block having perpendicularly disposed level vials is useful in setting pins perpendicular to an irregular convex work surface.

---

The invention described herein was made by an employee of the United States Government and may be manufactured and used by or for the government for governmental purposes without the payment of any royalties thereon or therefor.

This invention relates to a device for adjustably positioning a guide member over a surface, and particularly for leveling a guide member over an irregular surface.

The prior art has utilized a three-legged guide device, in combination with a bubble level indicator means. The three legs threadedly engage a guide member, and their respective heights are adjusted by screwing the legs up or down in the guide member. In the course of work performed on a project concerning a mock-up of the moon's surface, it became necessary to set pins perpendicularly into the surface. This prior art structure has several rather substantial disadvantages when working with such a rough, irregular surface. One of these is the inordinate amount of time that must be consumed in making gross adjustments, due to the screw thread adjustment means. Another is the inherent instability of the guide member, since the legs must be located relatively proximate to the central portion of the device in order to produce reasonably rapid adjustability, even on a relatively smooth surface. An additional disadvantage is the relatively expensive construction involved since extensive threads on the legs and the guide member must be cut, and a great number of such devices were required by the project.

It is therefore an object of the present invention to provide a device adapted to position a guide member over a rough surface without laborious, time-consuming adjustments.

It is a further object to produce a device which is capable of positioning a guide member over a grossly irregular surface with a high degree of stability in the selected position.

It is a further object to provide such a device which is inexpensive and simple to manufacture, yet provides a high degree of precision in its operation.

It is a further object to provide a device in which support members frictionally and rotatably engage a guide member to allow rapid, gross adjustments in the attitude of the guide member.

It is a further object to provide a device for setting pins perpendicular to the horizontal into an irregular convex surface.

These and other objects and advantages will become apparent on examination of the drawing and specification.

In describing the preferred embodiment of the invention illustrated in the drawings, specific terminology will be resorted to for the sake of clarity. However, it is not intended to be limited to the specific terms so selected, and it is to be understood that each specific term includes all technical equivalents which operate in a similar manner to accomplish a similar purpose.

FIG. 1 is a plan view of the preferred embodiment of the present invention.

FIG. 2 is an elevational view of the preferred embodiment.

FIG. 3 shows an alternate arrangement of the means biasing the legs and the guide member into frictional engagement.

The basic arrangement of the apparatus consists of a central guide member, to which support members are swingingly mounted. The support members and the central guide member frictionally engage each other in such a manner as to allow each support member to be individually set in any given attitude with respect to the central guide member and to each other. Adjustment of the support members in turn varies the attitude over a working surface of the central guide member as located by the support members on the working surface.

The term "attitude" as used herein is defined as a given angular orientation in space of a given plane with some other plane. From this it is understood that if there is a change in "attitude" between two bodies there must be an angular change between given planes lying on the two bodies. This definition is in keeping with the general import of the word.

Referring to the drawings, FIGS. 1 and 2 show the preferred embodiment of the device, indicated generally as 10. FIG. 2 also shows a working surface 11. The apparatus includes a central guide member 12, which may be of wood or any other suitable material. This member is shaped as a block of an equi-sided hexagonal configuration. This particular configuration is used, together with the beveled lower edges 13, to improve visibility of the area beneath the device although it is to be understood that the use of other shapes is within the scope of the invention. In the preferred embodiment, the guide member is utilized for setting pins 21, perpendicularly into an irregular surface, which as above noted was a mock-up of the moon's surface, and therefore a hole 20, is bored through the central member perpendicular to the top surface, thereby forming a guide surface. While this particular guide surface is shown, it is clear that other guide surfaces or devices could be combined with the apparatus, as for example, a precision angle block or gage member could be set up on the top portion.

Mounted to swing on guide member 12 are three support members or legs 14, which could be constructed out of any flat stock material, such as wood, metal or plastic, as desired. These legs are generally angularly shaped and have rounded ends. As can readily be seen, this angularly shaped configuration considerably enhances the inherently stable design of the device, since at low angles between the top surface and the legs, there is a higher likelihood the legs will clear intermediate protrusions, and the device will still be resting on the leg ends rather than a leg side. It further increases the flexibility of adjustment, since it allows leg adjustments to be made to the point that the leg is directed above the top surface, without interference between the central guide member and the surface underneath. It is further useful when locating the guide member over a generally convex surface, as indicated at 11, for the same reason as above, i.e., the central member will not rest on the high point of the convexity, but will still be supported on the leg ends.

The legs are rotatably mounted by means of wood screws, pins or machine screws 15, depending on the particular materials used, carried in alternating side surfaces, centrally located and perpendicular thereto. This particular means of mounting the legs on the guide member allows large angular movements of the legs without interference with the guide member, and leaves the guide member of relatively simple configuration. In FIG. 1, the mounting means is shown as a wood screw 15, the central guide member 12 is of wooden construction, and a washer 16, and a spring washer 17 are also mounted on the screw. The spring reacts against the washer and screw head and forces the leg 14 into frictional engagement with the side surface of the block 12. By screwing 15 in or out of the guide member 12, the frictional force can be controlled, depending on the operation to be performed.

In FIG. 3, an alternate construction is shown in which the leg is constructed of a ferro-magnetic material and the block 12 of a ferrous material. The magnetic attraction between the two members produces the desired frictional engagement. The friction-drag setting feature allows rapid, gross changes in the set attitude of the several leg members relative one another and the guide means and thus similar changes in the attitude of the surfaces of the guide member relative a surface on which it is supported by means of the legs, yet retaining a high degree of stability of the guide member in any set position.

The disclosed embodiment also incorporates a means for setting the top surface of the guide member horizontally. This means takes the form of two bubble levels joined at 90° to each other indicated at 19, and mounted on the top surface of the guide member. In use, locating the attitude of the block by adjusting until the bubble levels are centered locates the top surface as parallel to the horizontal. In the embodiment shown, a pin 21 may then be guided by the hole to be set perpendicularly into the surface 11, as was done in using the device in the course of the project mentioned above. Or, the hole could be used as a drill guide for boring a perpendicular hole into the surface.

The above description sets forth a guide device which is simple, inexpensive to manufacture, allows rapid, gross adjustments, allows a great deal of flexibility in the range of adjustment, and is relatively precise and stable in use.

It is to be understood that the form of the invention herewith shown and described is to be taken as a preferred embodiment. Various changes may be made in the shape, size, and arrangement of parts. For example, equivalent elements may be substituted for those illustrated and described herein, parts may be reversed, and certain features of the invention may be utilized independently of the use of other features. Even though this device was utilized to set pins into a mock lunar surface, it has many other uses in other areas.

What is claimed is:

1. An adjustable attitude guide device for facilitating drilling of holes, setting of pins and the like, perpendicular to an irregular spherical surface, comprising:
   (1) a guide member, said guide member having:
      (a) parallel top and
      (b) bottom surfaces and
      (c) at least three equiangular side surfaces perpendicularly disposed in relationship to said top and bottom surfaces, said guide member further being provided with
      (d) a substantially centrally disposed opening extending therethrough from said top and bottom surfaces and perpendicular to said surface,
      (e) a means to indicate when the axis of the centrally disposed opening is perpendicular to the horizontal,
   (2) at least three support members each adjustably connected to selected ones of said side surfaces and equidistantly spaced from each other, each said support member having
      (a) a first portion of major length and
      (b) a second portion of minor length, said major length portion extending outwardly away from said guide member and said other support members and normally positioned substantially along a plane intermediate and parallel with parallel planes taken along said top and bottom surface of said guide member, said minor length portion being integral with said major length portion and extending downwardly substantially perpendicular thereto and adapted to engage the irregular spherical surface of a body when the device is in use,
   (3) means for setting said support members at individually selective attitude relative to each other and said guide member to level the device on an irregular spherical surface, whereby, said guide member can be supported with little clearance at a selected attitude over an irregular spherical supporting surface and said opening in said guide member can be utilized to drill holes or set pins perpendicular to the surface on which the device rests.

2. A guide device according to claim 1 wherein the edge defined by said side and bottom surfaces is beveled so as to increase visibility of the area underneath said guide member at low clearances.

References Cited

UNITED STATES PATENTS

| 1,224,682 | 10/1917 | Akeley | 248—188 |
| 2,305,223 | 12/1942 | Blaschke | 33—73 |
| 2,342,233 | 2/1944 | Wood | 248—188.7 |
| 3,361,404 | 1/1968 | Lohr | 248—206 |
| 313,723 | 3/1885 | Gotze. | |
| 2,575,245 | 11/1951 | Carlson et al. | |

FOREIGN PATENTS

| 119,689 | 4/1901 | Germany. |
| 326,209 | 1903 | France. |

LEONARD FORMAN, Primary Examiner

DENNIS A. DEARING, Assistant Examiner

U.S. Cl. X.R.

248—44, 188.2